(12) United States Patent
Sims

(10) Patent No.: US 11,617,057 B2
(45) Date of Patent: Mar. 28, 2023

(54) SYSTEM AND METHOD FOR INFORMING TRAVELERS OF NEARBY PET RELIEF AREAS

(71) Applicant: Pamela Jacques Sims, Peachtree City, GA (US)

(72) Inventor: Pamela Jacques Sims, Peachtree City, GA (US)

( * ) Notice: Subject to any disclaimer, the term of this patent is extended or adjusted under 35 U.S.C. 154(b) by 0 days.

(21) Appl. No.: 17/769,981

(22) PCT Filed: Oct. 21, 2020

(86) PCT No.: PCT/IB2020/059909
§ 371 (c)(1),
(2) Date: Apr. 18, 2022

(87) PCT Pub. No.: WO2021/079294
PCT Pub. Date: Apr. 29, 2021

(65) Prior Publication Data
US 2022/0377498 A1    Nov. 24, 2022

Related U.S. Application Data

(60) Provisional application No. 62/923,799, filed on Oct. 21, 2019.

(51) Int. Cl.
*H04W 24/00* (2009.01)
*H04W 4/024* (2018.01)
(Continued)

(52) U.S. Cl.
CPC ........... *H04W 4/024* (2018.02); *H04W 4/021* (2013.01); *H04W 64/00* (2013.01)

(58) Field of Classification Search
CPC ....... H04W 4/70; H04W 4/021; H04W 4/024; H04W 64/00; H04L 67/303; H04L 67/53
(Continued)

(56) References Cited

U.S. PATENT DOCUMENTS 10,228,258 B2   3/2019  Mach
10,248,928 B2   4/2019  Dikman
(Continued)

FOREIGN PATENT DOCUMENTS

WO    WO2007018290 A1    2/2007

OTHER PUBLICATIONS

Working Like Dogs-Where to Go, Retrieved from Apple App Store, Retrieved on Oct. 6, 2020 <URL: https://apps.apple.com/de/app/working-like-dogs-where-to-go/id501637422?l=en>.
(Continued)

*Primary Examiner* — Joseph Arevalo

(57) ABSTRACT

A system and method are provided to inform travelers of nearby pet relief areas. At least one remote server manages at least one user account. The user account is associated with a corresponding PC device. The remote server includes a plurality of terminal profiles, and each terminal profile includes a plurality of nearby service animal relief area (SARA) locations. The remote server retrieves travel information for the user account and compares the travel information with the plurality of terminal profiles. After comparing the travel information with the plurality of terminal profiles, the remote server identifies at least one closest departure SARA location and at least one closest arrival SARA location for the user account. The closest departure SARA location and one closest arrival SARA location can then be displayed to the user through the corresponding PC device.

8 Claims, 11 Drawing Sheets

(51) Int. Cl.
*H04W 4/021* (2018.01)
*H04W 64/00* (2009.01)

(58) Field of Classification Search
USPC ......... 455/456.1, 436, 466, 456.3, 521, 418, 455/432.3
See application file for complete search history.

(56) References Cited

U.S. PATENT DOCUMENTS

| | | |
|---|---|---|
| 10,715,653 B2 | 7/2020 | Daoud |
| 2004/0245335 A1 | 12/2004 | Amri |
| 2009/0276250 A1 | 11/2009 | King |
| 2012/0109695 A1 | 5/2012 | Forkhamer |
| 2012/0174015 A1* | 7/2012 | Erling .................... G06Q 10/10 715/771 |
| 2015/0330797 A1 | 11/2015 | Shukla |
| 2016/0342693 A1* | 11/2016 | Samuel .................. G06Q 50/01 |
| 2020/0267936 A1* | 8/2020 | Tran ..................... A01K 29/005 |

OTHER PUBLICATIONS

BringFido, Retrieved from Internet, Retrieved on Oct. 6, 2020 <URL: https://www.bringfido.com/>.
PetFlight.com, https://web.archive.org/web/20190624102837/https://www.petflight.com/relieving_places, dated Jun. 24, 2019.

* cited by examiner

US 11,617,057 B2

SYSTEM AND METHOD FOR INFORMING TRAVELERS OF NEARBY PET RELIEF AREAS

The current application is a 371 of international Patent Cooperation Treaty (PCT) application PCT/M2020/059909 filed on Oct. 21, 2020. The PCT application PCT/M2020/059909 claims a priority to the U.S. Provisional Patent application Ser. No. 62/923,799 filed on Oct. 21, 2019.

FIELD OF THE INVENTION

The present invention relates generally to software applications for travel. More specifically, the present invention is a system and method for informing travelers of nearby pet relief areas.

BACKGROUND OF THE INVENTION

Travel and the use of high-speed transportation is essential for work or vacation purposes. Individuals may be accompanied by a pet or service animal when traveling to a destination. When at a travel terminal such as, but not limited to, an airport or train station, the pet or service animal may need to relieve itself. Individuals may not be aware that the travel terminal includes service animal relief area (SARA) locations or may not know where a nearby SARA location is located. This can result in the pet or service animal relieving itself in unauthorized areas which can negatively impact the traveling public at large.

It is therefore an objective of the present invention to provide a system and method for informing travelers of nearby pet relief areas. The present invention is a software application that can be accessed by any user traveling with a pet or service animal. A user can input his or her travel information into the software application, and the software application compares the travel information to a database of various terminals. The software application then outputs the closest SARA locations to the user in order for the pet or service animal to relieve itself in an authorized area without negatively impacting traveling public at large.

DETAIL DESCRIPTIONS OF THE INVENTION

All illustrations of the drawings are for the purpose of describing selected versions of the present invention and are not intended to limit the scope of the present invention.

Figure 1:
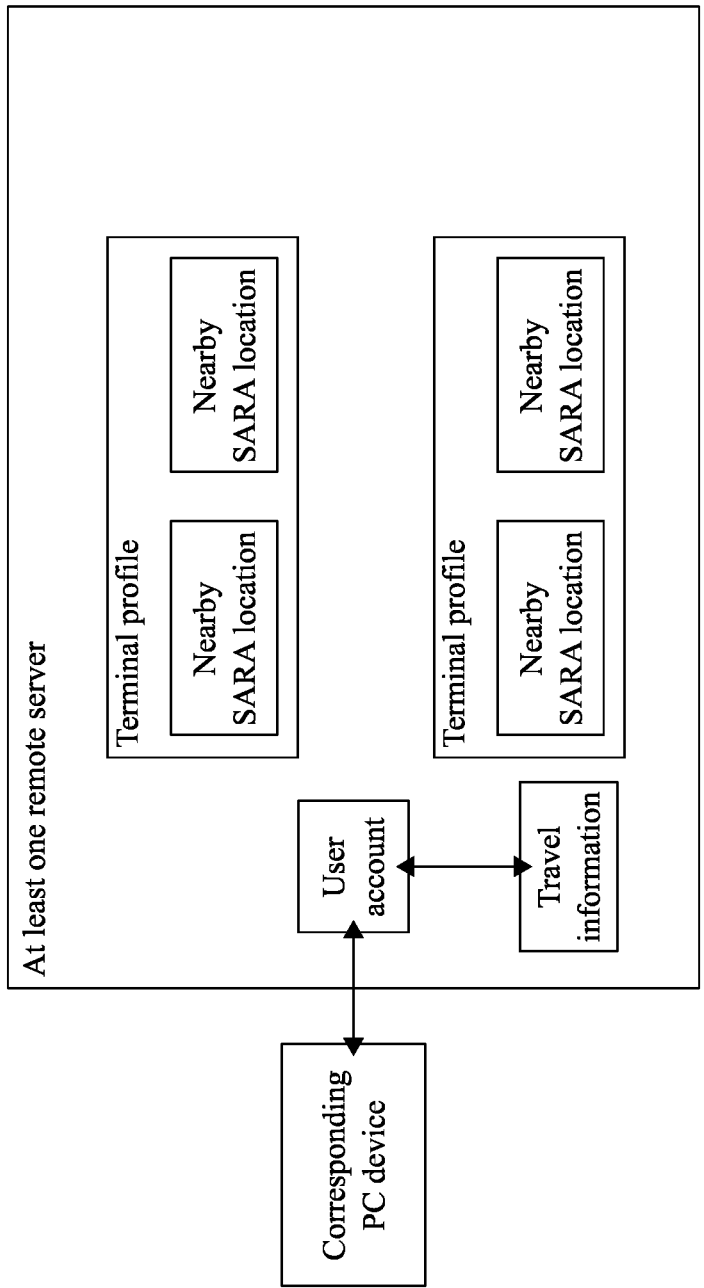
FIG. 1 is a diagram illustrating the system of the present invention.

In reference to FIGS. 1 through 11, the present invention is a system and method for informing travelers of nearby pet relief areas. With reference to FIG. 1, the system of the present invention includes at least one remote server that manages at least one user account (Step A). The user account is associated with a corresponding personal computing (PC) device. The user account can be created by any individual in order to access the present invention. The corresponding PC device may be any computing device such as, but not limited to, a desktop computer, a mobile device, or a notebook computer. A plurality of terminal profiles is stored on the remote server (Step B). Each terminal profile includes a plurality of nearby service animal relief area (SARA) locations. The plurality of terminal profiles is a set of profiles that include information about travel terminals such as, but not limited to, airports or train stations. The plurality of nearby SARA locations are authorized areas, physically onsite or near a travel terminal, where a pet or service animal can relieve itself.

Figure 2:
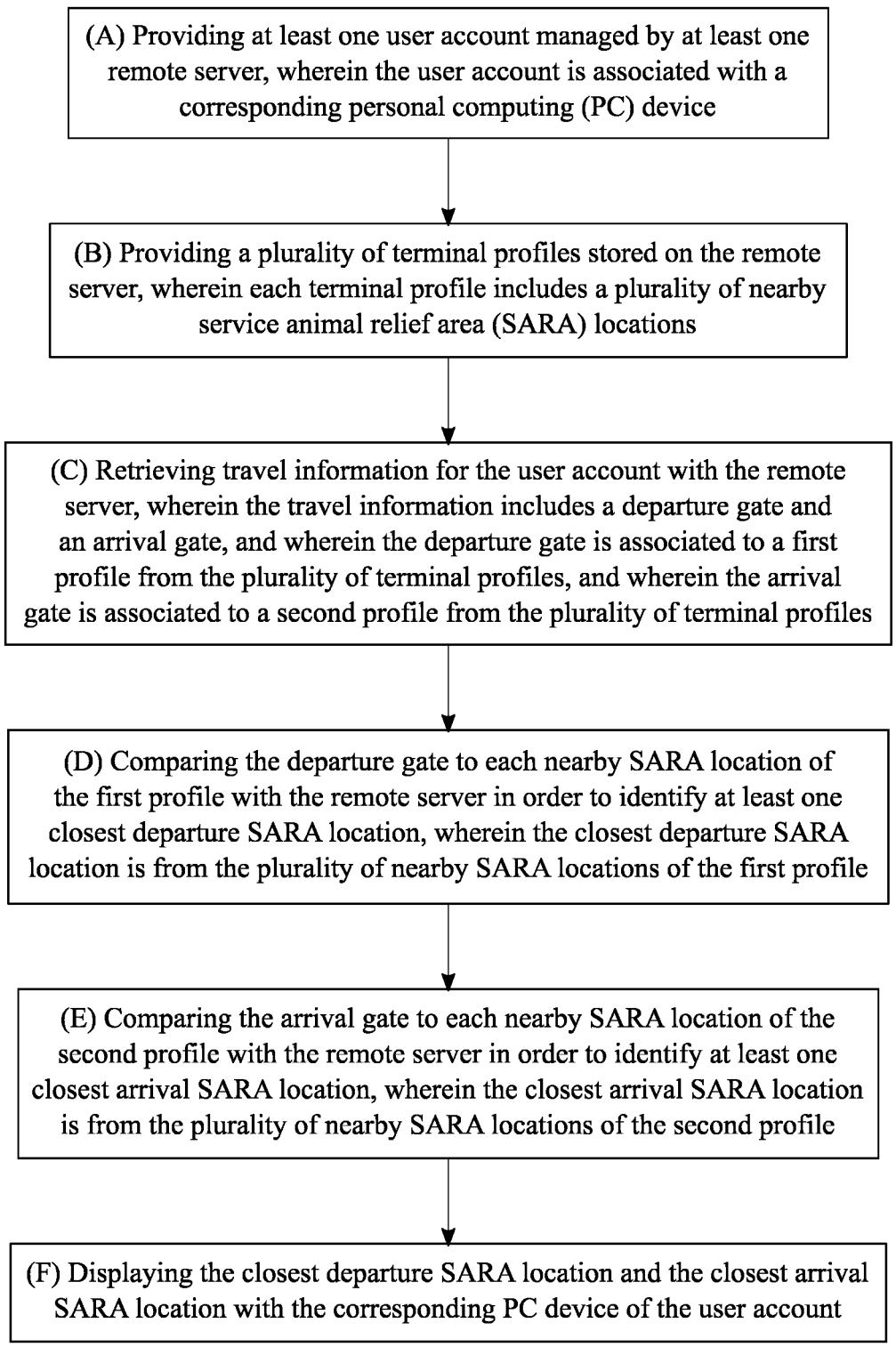
FIG. 2 is a flowchart illustrating the overall process for the method of the present invention.

The method of the present invention follows an overall process for informing travelers of nearby pet relief areas. With reference to FIG. 2, first, the remote server retrieves travel information for the user account (Step C). The travel information is information from a user that is traveling with a pet or service animal. Further, the travel information is the typical information found on a boarding pass for a flight or on a train ticket. The travel information includes a departure gate and an arrival gate. The departure gate is associated to a first profile from the plurality of terminal profiles, and the arrival gate is associated to a second profile form the plurality of terminal profiles. The first profile is a profile of a first travel terminal where the user will be departing from during his or her trip. The second profile is a profile of a second travel terminal where the user will arrive at during his or her trip. The departure gate is a gate where the user needs to be before departing from the first travel terminal. The arrival gate is a gate where the user must pass after arriving at the second travel terminal. The remote server then compares the departure gate to each nearby SARA location of the first profile in order to identify at least one closest departure SARA location (Step D). The closest departure SARA location is from the plurality of nearby SARA locations of the first profile. The closest departure SARA location is at least one SARA location that is physically located near the departure gate. The remote server also compares the arrival gate to each nearby SARA location of the second profile with the remote server in order to identify at least one closest arrival SARA location (Step E). The closest arrival SARA location is from the plurality of nearby SARA locations of the second profile. The closest arrival SARA location is at least one SARA location that is physically located near the arrival gate. The corresponding PC device of the user account displays the closest departure SARA location and the closest arrival SARA location (Step F). Thus, the user is informed of nearby pet relief areas in order for his or her pet or service animal to relive itself in an authorized area.

Figure 3:
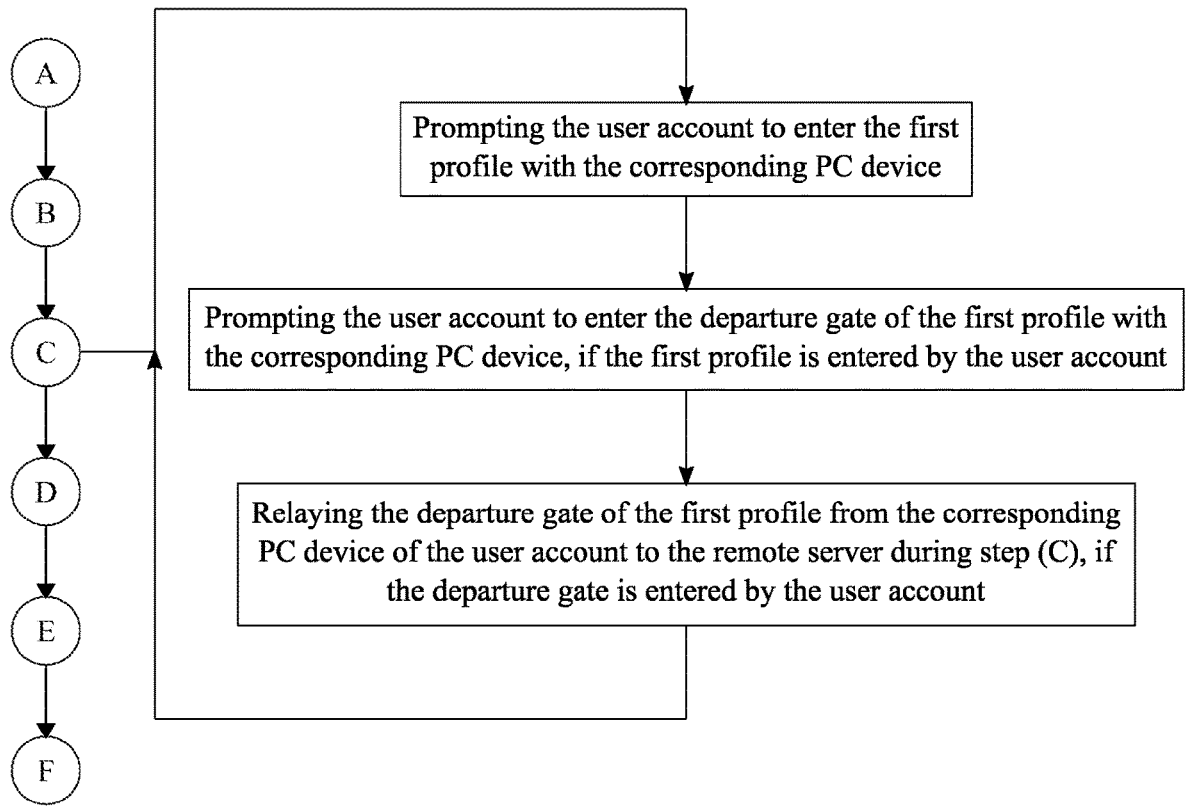
FIG. 3 is a flowchart illustrating the subprocess on how the remote server receives information regarding the first travel terminal and the departure gate.

In order for the remote server to receive information regarding the first profile and associate the departure gate to the first profile and with reference to FIG. 3, the following subprocess is executed. The corresponding PC device prompts the user account to enter the first profile. Thus, the user can enter information about the first travel terminal where the user will be departing from during his or her trip. Next, the corresponding PC device prompts the user account to enter the departure gate of the first profile, if the first profile is entered by the user account. Thus, the user can enter information about the gate where the user needs to be before departing from the first travel terminal. The departure gate of the first profile is relayed from the corresponding PC device of the user account to the remote server during Step C, if the departure gate is entered by the user account. Thus, the remote server receives information regarding the first travel terminal and the gate where the user needs to depart from during his or her trip.

Figure 4:
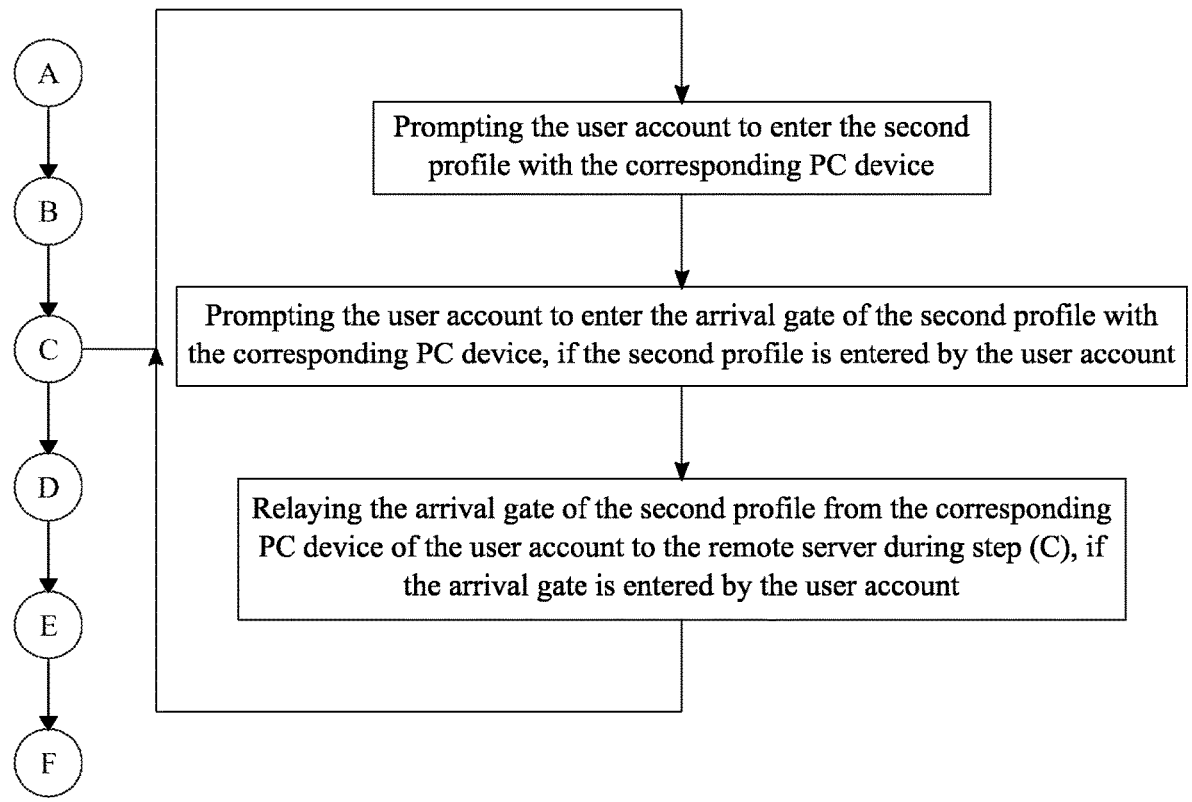
FIG. 4 is a flowchart illustrating the subprocess on how the remote server receives information regarding the second travel terminal and the arrival gate.

Similarly and in order for the remote server to receive information regarding the second profile and associate the arrival gate to the second profile and with reference to FIG. 4, the following subprocess is executed. The corresponding PC device prompts the user account to enter the second profile. Thus, the user can enter information about the second travel terminal where the user will be departing from during his or her trip. Next, the corresponding PC device prompts the user account to enter the arrival gate of the second profile, if the second profile is entered by the user account. Thus, the user can enter information about the gate where the user must pass after arriving at the second travel terminal. The arrival gate of the second profile is relayed from the corresponding PC device of the user account to the remote server during Step C, if the arrival gate is entered by the user account. Thus, the remote server receives information regarding the second travel terminal and the gate where the user must enter after arriving at the second travel terminal during his or her trip.

Figure 5:
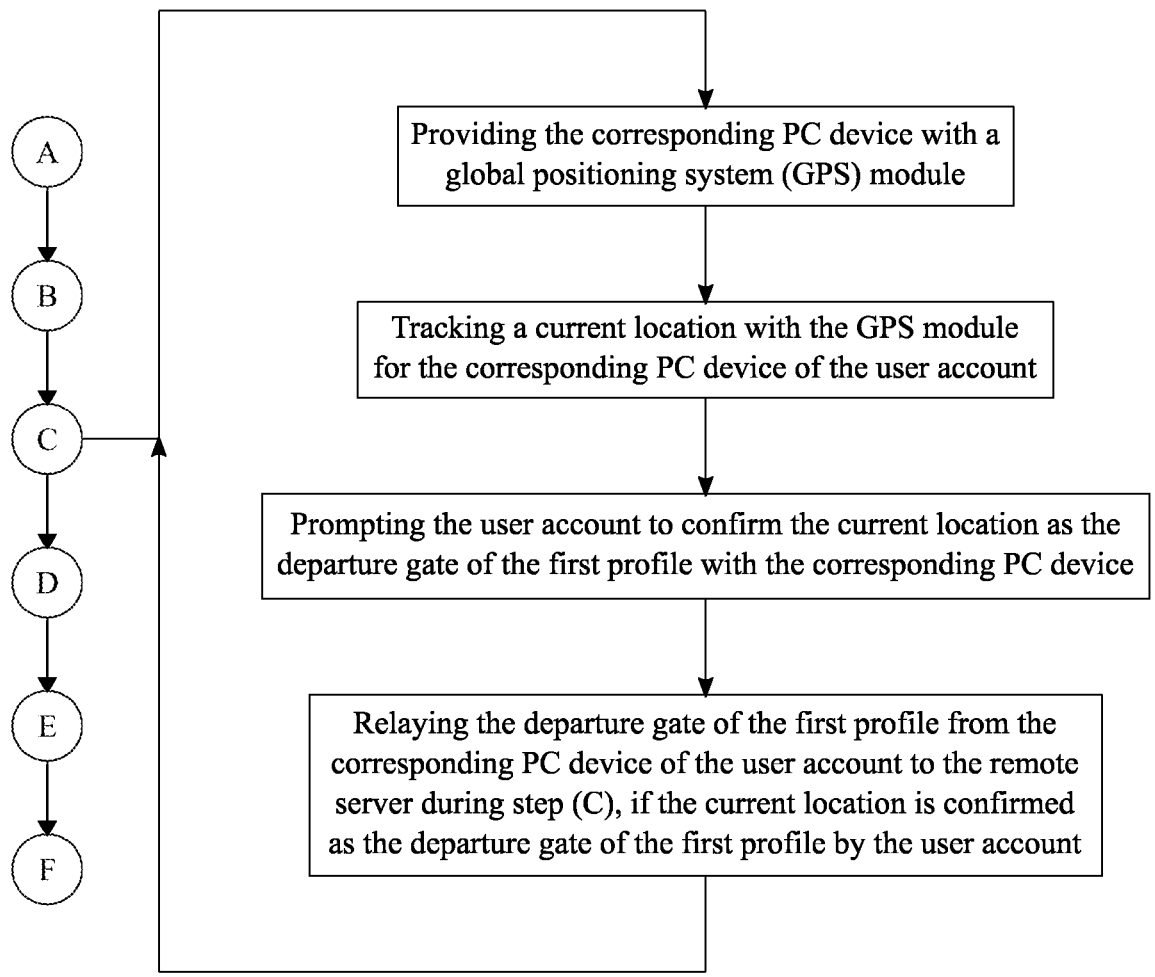
FIG. 5 is a flowchart illustrating the subprocess on how the remote server receives information regarding the first travel terminal and the departure gate through a GPS module.

Alternatively and with reference to FIG. 5, the remote server can receive information regarding the first profile and associate the departure gate to the first profile through use of a global positioning system (GPS) module. In this case, the corresponding PC device is preferably a mobile device provided with a GPS module. The GPS module tracks a current location for the corresponding PC device of the user account. The current location is the physical location of the corresponding PC device defined by graphical coordinates. The corresponding PC device prompts the user account to confirm the current location as the departure gate of the first profile. Thus, the user can provide information regarding the first travel terminal and the gate where the user needs to be before departing from the first travel terminal. The departure gate of the first profile is relayed from the corresponding PC device of the user account to the remote server during Step C, if the current location is confirmed as the departure gate of the first profile by the user account. Thus, the remote server receives information regarding the first travel terminal and the gate where the user needs to depart from the first travel terminal.

Figure 6:
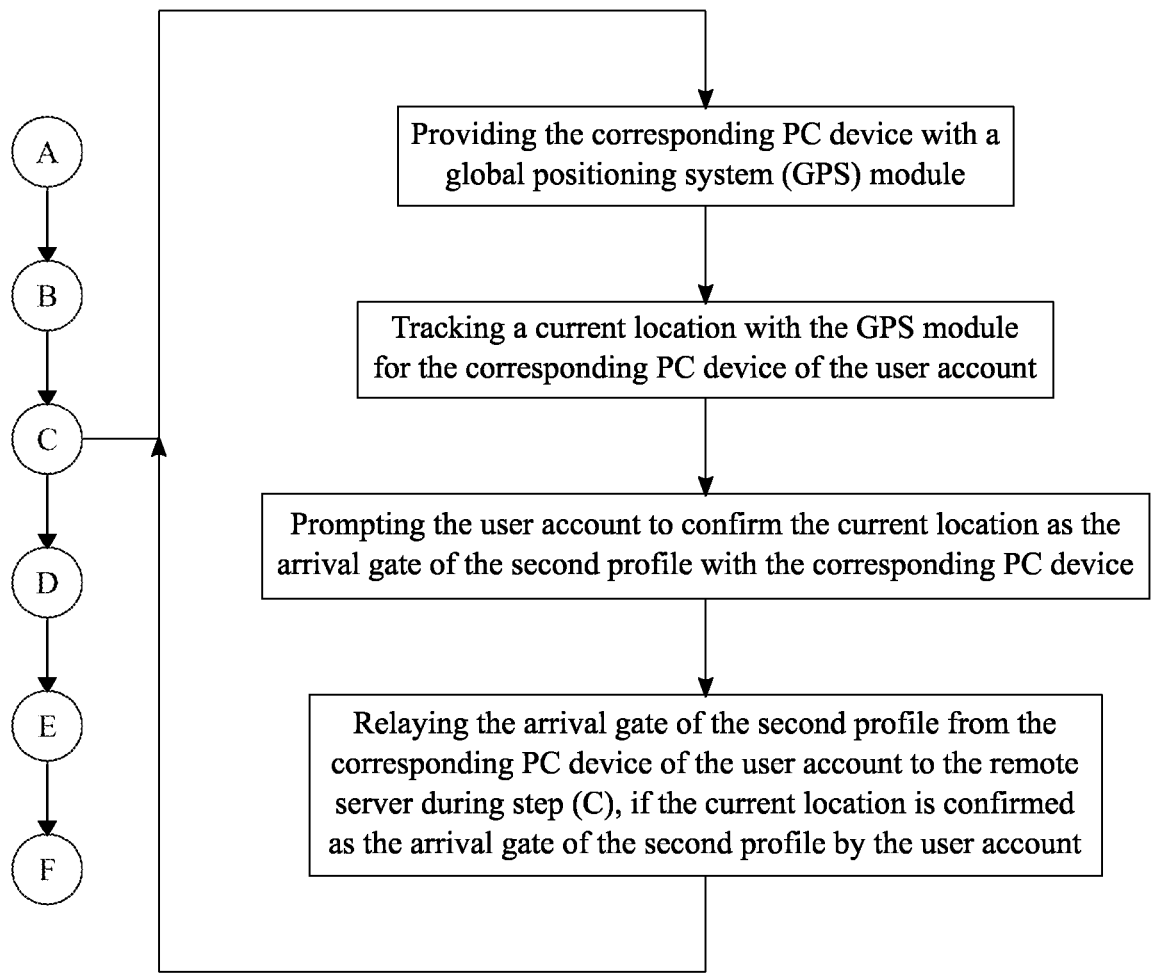
FIG. 6 is a flowchart illustrating the subprocess on how the remote server receives information regarding the second travel terminal and the arrival gate through a GPS module.

Similarly and with reference to FIG. 6, the remote server can receive information regarding the second profile and associate the arrival gate to the second profile through use of a global positioning system (GPS) module. The GPS module tracks a current location for the corresponding PC device of the user account. The current location is the physical location of the corresponding PC device defined by graphical coordinates. The corresponding PC device prompts the user account to confirm the current location as the arrival gate of the second profile. Thus, the user can provide information regarding the second travel terminal and the gate where the user must pass after arriving at the second travel terminal. The arrival gate of the second profile is relayed from the corresponding PC device of the user account to the remote server during Step C, if the current location is confirmed as the arrival gate of the second profile by the user account. Thus, the remote server receives information regarding the second travel terminal and the gate where the user must pass after arriving at the second travel terminal.

Figure 7:
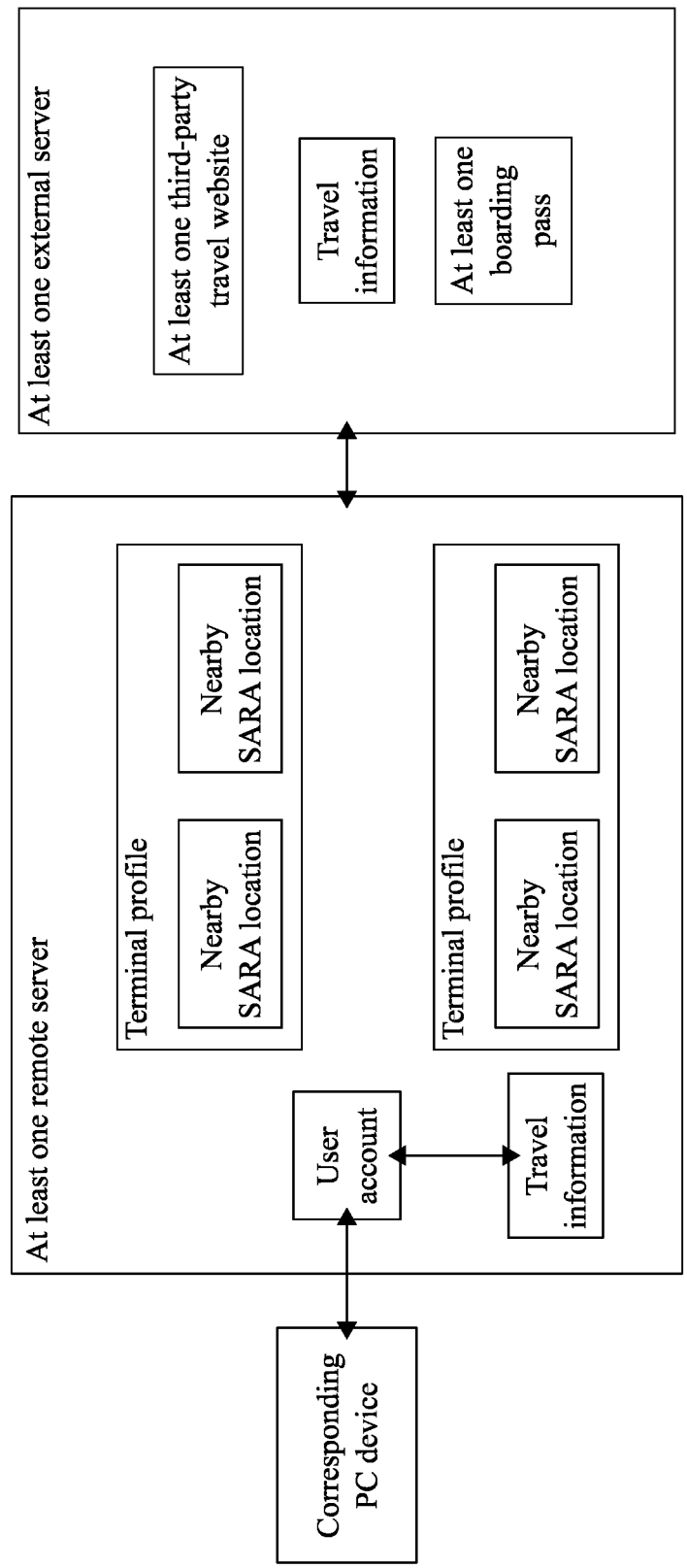
FIG. 7 is a diagram illustrating the system for the present invention interacting with an external server.
Figure 8:
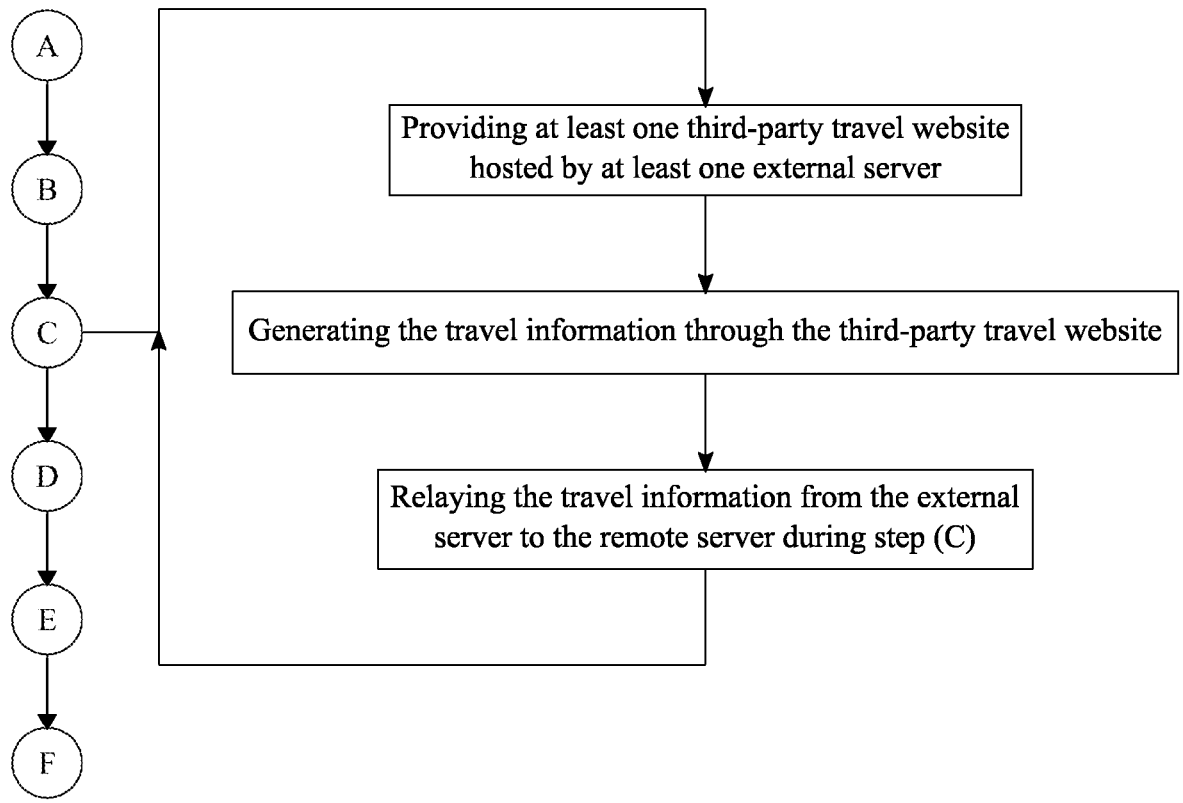
FIG. 8 is a flowchart illustrating the subprocess on how the remote server retrieves the travel information from the external server.
Figure 9:
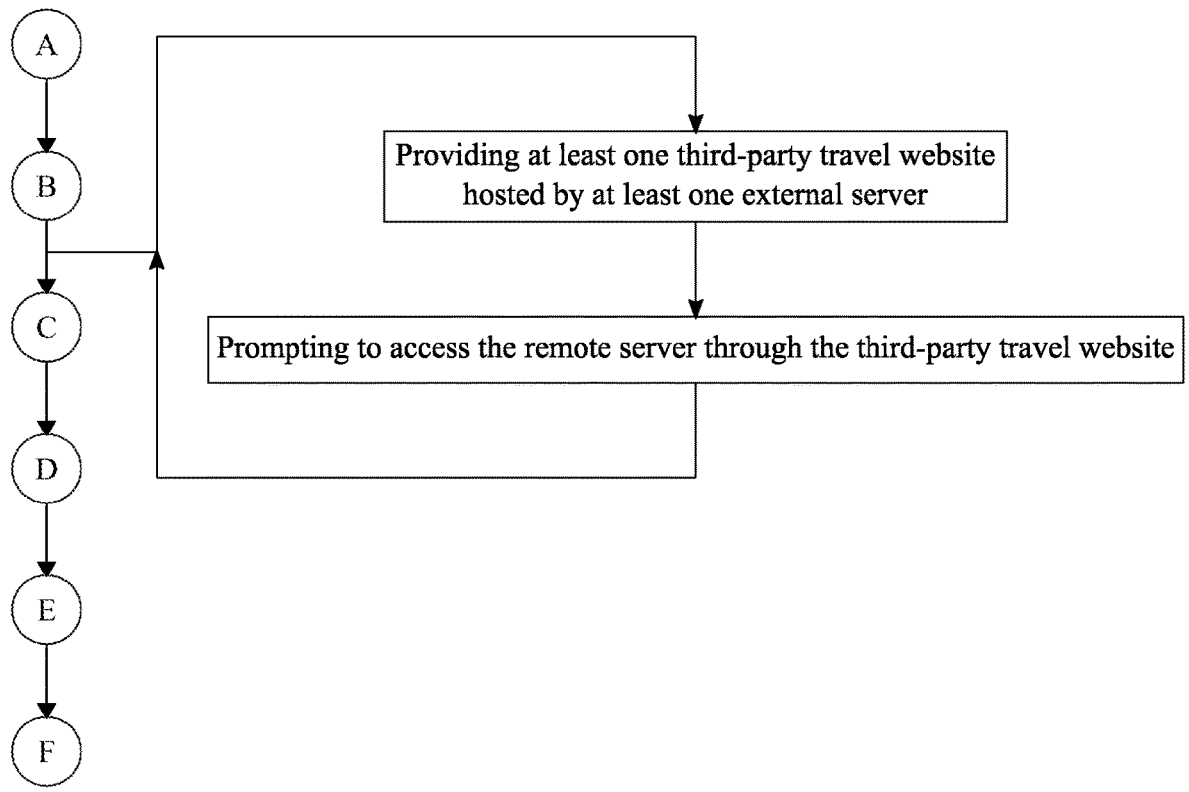
FIG. 9 is a flowchart illustrating the subprocess on how the external server can direct a user to the remote server.

In order for the remote server to retrieve the travel information from a third-party travel website and with reference to FIGS. 7 and 8, the following subprocess is executed. At least one third-party travel website is hosted by at least one external server. The third-party travel website may be any travel website such as, but not limited to, websites associated to airlines or train stations, Booking.com, Travelocity.com, or Expedia.com. Thus, the third-party travel website generates the travel information. In more detail, the travel information is generated based on trip information entered by the user account accessing the third-party travel website. The travel information is relayed from the external server to the remote server during Step C. Thus, the remote server can retrieve the travel information from a third-party travel website. Additionally and with reference to FIG. 9, the third-party travel website can direct a user to the remote server in order to be informed of nearby pet relief areas. The third-party travel website prompts to access the remote server. In more detail, a link to the remote server can be displayed on the third-party travel website. Thus, the user can be directed to the remote server by the third-party travel website.

Figure 10:
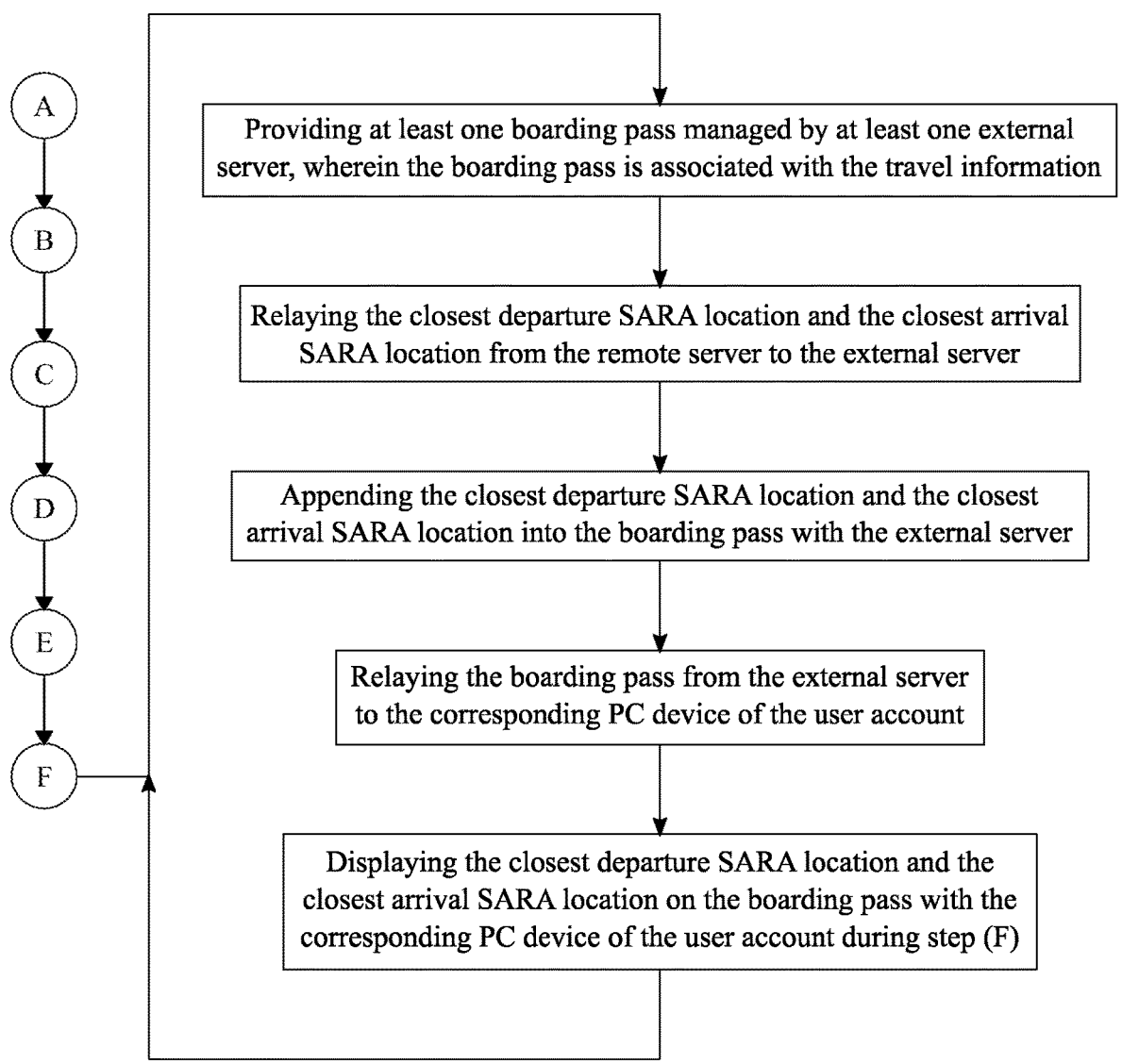
FIG. 10 is a flowchart illustrating the subprocess on how the closest departure SARA location and the closest arrival SARA location can be displayed on a boarding pass.

In order for the closest departure SARA location and the closest arrival SARA location to be displayed on a boarding pass and with reference to FIG. 10, the following subprocess is executed. At least one boarding pass is managed by at least one external server. The boarding pass is associated with the travel information. In further detail, the boarding pass is the pass required for the user to board a plane, train or some other kind of transportation, and the boarding pass includes the travel terminal and gate information. The closest departure SARA location and the closest arrival SARA location is relayed from the remote server to the external server. The external server appends the closest departure SARA location and the closest arrival SARA location into the boarding pass. In more detail, the closest departure SARA location and the closest arrival SARA location is written onto the boarding pass by the external server. The boarding pass is then relayed from the external server to the corresponding PC device of the user account. Finally, the corresponding PC device of the user account displays the closest departure SARA location and the closest arrival SARA location on the boarding pass during Step F. Thus, a user can be informed of the closest departure SARA location and the closest arrival SARA location through a boarding pass.

Figure 11:
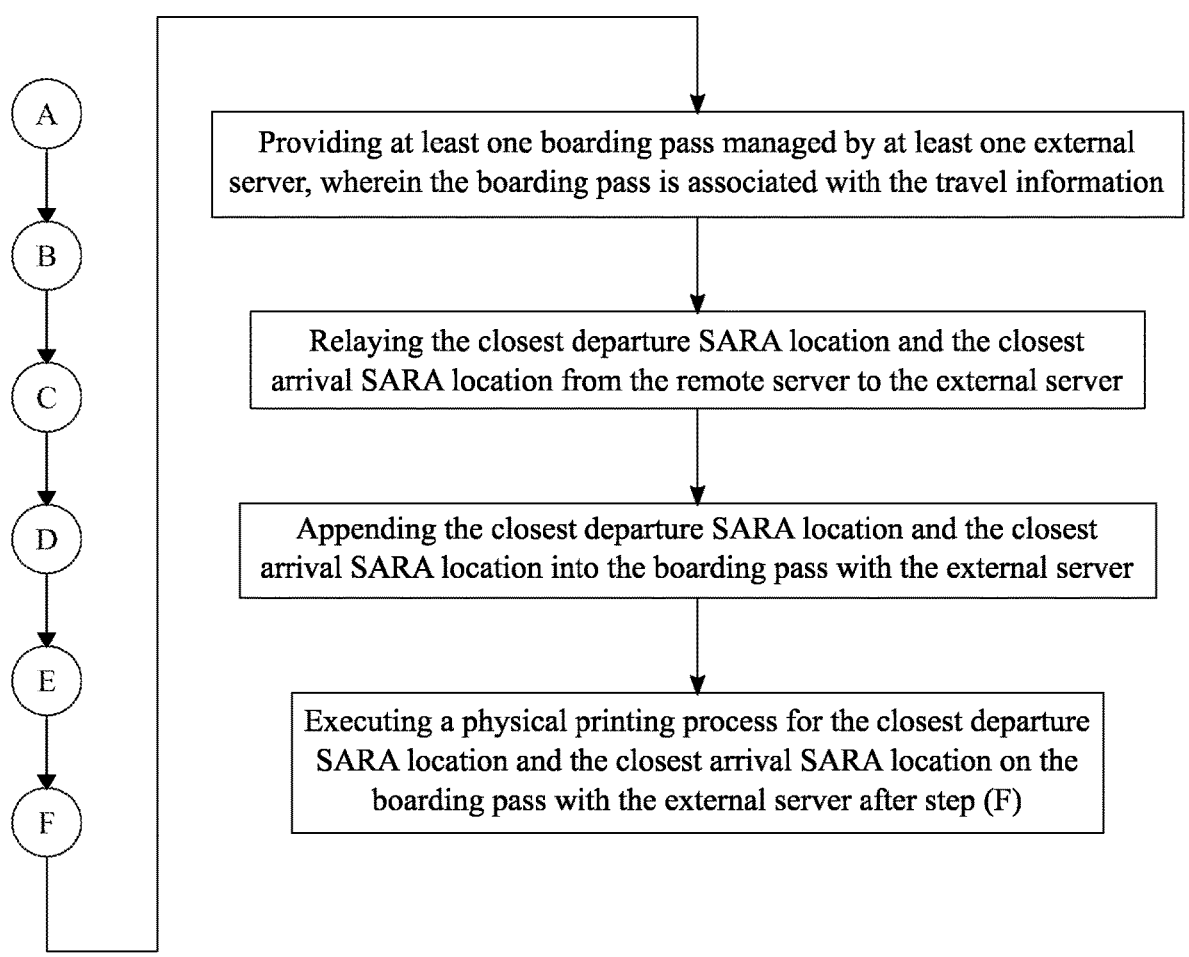
FIG. 11 is a flowchart illustrating the subprocess on how the boarding pass can be physically printed with the closest departure SARA location and the closest arrival SARA location.

In order for a boarding pass to be physically printed with the closest departure SARA location and the closest arrival SARA location and with reference to FIG. 11, the following subprocess is executed. The closest departure SARA location and the closest arrival SARA location is relayed from the remote server to the external server. The external server appends the closest departure SARA location and the closest arrival SARA location into the boarding pass. In more detail, the closest departure SARA location and the closest arrival SARA location is written onto the boarding pass by the external server. The external server executes a physical printing process for the closest departure SARA location and the closest arrival SARA location on the boarding pass after Step F. Thus, a user can have a physical copy of the boarding pass that is physically printed with the closest departure SARA location and the closest arrival SARA location.

Although the invention has been explained in relation to its preferred embodiment, it is to be understood that many other possible modifications and variations can be made without departing from the spirit and scope of the invention as hereinafter claimed.

What is claimed is:

1. A method for informing travelers of nearby pet relief areas, the method comprises the steps of:
   (A) providing at least one user account managed by at least one remote server, wherein the user account is associated with a corresponding personal computing (PC) device;
   (B) providing a plurality of terminal profiles stored on the remote server, wherein each terminal profile includes a plurality of nearby service animal relief area (SARA) locations;
   (C) retrieving travel information for the user account with the remote server, wherein the travel information includes a departure gate and an arrival gate, and wherein the departure gate is associated to a first profile from the plurality of terminal profiles, and wherein the arrival gate is associated to a second profile from the plurality of terminal profiles;
   (D) comparing the departure gate to each nearby SARA location of the first profile with the remote server in order to identify at least one closest departure SARA location, wherein the closest departure SARA location is from the plurality of nearby SARA locations of the first profile;
   (E) comparing the arrival gate to each nearby SARA location of the second profile with the remote server in order to identify at least one closest arrival SARA location, wherein the closest arrival SARA location is from the plurality of nearby SARA locations of the second profile;
   (F) displaying the closest departure SARA location and the closest arrival SARA location with the corresponding PC device of the user account;
       providing at least one boarding pass managed by at least one external server, wherein the boarding pass is associated with the travel information;
       relaying the closest departure SARA location and the closest arrival SARA location from the remote server to the external server;
       appending the closest departure SARA location and the closest arrival SARA location into the boarding pass with the external server;
       relaying the boarding pass from the external server to the corresponding PC device of the user account; and
       displaying the closest departure SARA location and the closest arrival SARA location on the boarding pass with the corresponding PC device of the user account during step (F).

2. The method for informing travelers of nearby pet relief areas, the method as claimed in claim 1 comprises the steps of:
   prompting the user account to enter the first profile with the corresponding PC device;
   prompting the user account to enter the departure gate of the first profile with the corresponding PC device, if the first profile is entered by the user account; and
   relaying the departure gate of the first profile from the corresponding PC device of the user account to the remote server during step (C), if the departure gate is entered by the user account.

3. The method for informing travelers of nearby pet relief areas, the method as claimed in claim 1 comprises the steps of:
   prompting the user account to enter the second profile with the corresponding PC device;
   prompting the user account to enter the arrival gate of the second profile with the corresponding PC device, if the second profile is entered by the user account; and
   relaying the arrival gate of the second profile from the corresponding PC device of the user account to the remote server during step (C), if the arrival gate is entered by the user account.

4. The method for informing travelers of nearby pet relief areas, the method as claimed in claim 1 comprises the steps of:
   providing the corresponding PC device with a global positioning system (GPS) module;
   tracking a current location with the GPS module for the corresponding PC device of the user account;
   prompting the user account to confirm the current location as the departure gate of the first profile with the corresponding PC device; and
   relaying the departure gate of the first profile from the corresponding PC device of the user account to the remote server during step (C), if the current location is confirmed as the departure gate of the first profile by the user account.

5. The method for informing travelers of nearby pet relief areas, the method as claimed in claim 1 comprises the steps of:
   providing the corresponding PC device with a GPS module;
   tracking a current location with the GPS module for the corresponding PC device of the user account;
   prompting the user account to confirm the current location as the arrival gate of the second profile with the corresponding PC device; and
   relaying the arrival gate of the second profile from the corresponding PC device of the user account to the remote server during step (C), if the current location is confirmed as the arrival gate of the second profile by the user account.

6. The method for informing travelers of nearby pet relief areas, the method as claimed in claim 1 comprises the steps of:
   providing at least one third-party travel website hosted by at least one external server;
   generating the travel information through the third-party travel website; and
   relaying the travel information from the external server to the remote server during step (C).

7. The method for informing travelers of nearby pet relief areas, the method as claimed in claim 1 comprises the steps of:
   providing at least one third-party travel website hosted by at least one external server; and
   prompting to access the remote server through the third-party travel website.

8. The method for informing travelers of nearby pet relief areas, the method as claimed in claim 1 comprises the step of:
    executing a physical printing process for the closest departure SARA location and the closest arrival SARA location on the boarding pass with the external server after step (F).

\* \* \* \* \*